United States Patent
Germain et al.

(12) 
(10) Patent No.: US 6,350,529 B1
(45) Date of Patent: Feb. 26, 2002

(54) GAS-IMPERMEABLE ELASTIC MEMBRANE AND HYDROPNEMATIC ACCUMULATOR EQUIPPED WITH THIS MEASURE

(75) Inventors: Yves Germain, Serquigny; Jean-Luc Beal, Voisins-le-Bretonneux; Christophe Le Roy, Evreux, all of (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/024,313

(22) Filed: Feb. 17, 1998

(30) Foreign Application Priority Data

Feb. 17, 1997 (FR) ............................................. 97 01803

(51) Int. Cl.$^7$ ................................................. B32B 27/32
(52) U.S. Cl. ................. 428/476.3; 428/475.8; 428/36.8; 428/560; 427/372.2; 427/384; 427/383.5
(58) Field of Search ................ 428/36.8, 500, 428/475.8, 476.3; 427/384, 383.5, 377.2

(56) References Cited

U.S. PATENT DOCUMENTS

| | | | |
|---|---|---|---|
| 4,880,213 A | | 11/1989 | Shinbori et al. |
| 5,068,955 A | * | 12/1991 | Tse .............................. 428/213 |
| 5,491,009 A | * | 2/1996 | Bekele ....................... 428/35.7 |
| 5,707,750 A | * | 1/1998 | Degrassi ................... 428/475.8 |
| 6,068,933 A | * | 5/2000 | Shepard .................... 428/474.4 |

FOREIGN PATENT DOCUMENTS

| | | | |
|---|---|---|---|
| EP | 0 360 648 | 3/1990 | .......... F15B/1/047 |
| FR | 2 662 638 | 12/1991 | .......... B32B/27/06 |

OTHER PUBLICATIONS

Database WPI, Section Ch, Week 8422, Derwent Publications Ltd., London, GB; Class A32, AN 84–137143.

\* cited by examiner

*Primary Examiner*—Leszek Kiliman
(74) *Attorney, Agent, or Firm*—Pollock, Vande Sande & Amernick, R.L.L.P.

(57) ABSTRACT

A gas-impermeable elastic membrane including a co-polymeric gas-impermeable film including OH groups, positioned between two layers of a co-polymer containing blocks of polyamides and of polyesters, with a rubber coating on at least one of the two layers, as well as a method of manufacturing the membrane.

8 Claims, 1 Drawing Sheet

GAS-IMPERMEABLE ELASTIC MEMBRANE AND HYDROPNEMATIC ACCUMULATOR EQUIPPED WITH THIS MEASURE

FIELD OF THE INVENTION

The present invention relates to an impermeable elastic membrane, to a process for its manufacture and to a hydropneumatic accumulator equipped with this membrane and used, for example, in the suspensions of motor vehicles. Such an accumulator is in the form of a sphere separated by a membrane into two compartments, one of which contains a gas such as nitrogen and the other contains a liquid such as mineral oil. Under the effect of the oil pressure, the membrane becomes deformed and compresses the gas.

The main characteristics of the membrane are its flexibility, elasticity, impermeability to nitrogen, leaktightness and resistance to mineral hydraulic fluid.

BACKGROUND OF THE INVENTION

Two types of polyurethane-based membrane are currently used, for example a thermoplastic polyurethane such as Desmopan® from Bayer or a polyurethane combined with rubber such as Urepan®. The durability of these membranes is satisfactory, but they have a drawback as regards the low impermeability to nitrogen of polyurethane. This low impermeability limits the useful life of accumulators of limited. Thus, after three years of use on a vehicle, nearly half of the rating pressure is lost.

It is sought to improve the impermeability to nitrogen of membranes. EP-A-360,648 discloses, in particular, a membrane having twice the impermeability of the polyurethane-based one. This membrane contains two materials in combination, the first material giving the membrane the required elasticity and being selected from thermoplastic polyurethanes, polyether block amides and flexible polyesters or a mixture of these, the second material being immersed in the bulk of the first material in order to achieve the impermeability to gases and selected from an ethylene/vinyl alcohol copolymer, polyamides and polyvinylidene chloride or a mixture of these.

When an ethylene/vinyl alcohol copolymer is used as the second material, it is mixed with a polyether block amide, and the first material is a thermoplastic polyurethane. The thickness of the film is, in this case, typically between 10 and 200 micrometers.

Novel hydropneumatic accumulators have appeared recently on the market. They are described in document FR-A-2,662,638. They contain two compartments separated by a cold-resistant multilayer membrane forming a gas barrier. The film forming the gas barrier is of the polyvinyl alcohol type placed between two sheets of rubber. The role of the rubber is to ensure the leaktightness of the mounting of the membrane in the accumulator. The polyvinyl alcohol film contains a polyol-type plasticizer, for example glycerol, in a percentage of from 15 to 50% by weight.

These novel membranes are satisfactory, but owing to the fact that the plasticizer can migrate or evaporate, especially in the case of use at high temperatures, it is necessary to insert a skin of vapor-impermeable and plasticizer-impermeable resin, for example a polyethylene skin, between the film of polyvinyl alcohol and the rubber. Furthermore, these membranes require specific storage and handling conditions, owing to the presence of plasticizer.

FR-A-2,685,740 describes flexible membranes for hydropneumatic accumulators, which consist of a layer (1) of ethylene/vinyl alcohol (EVOH) copolymer placed between two layers of polyamide (2), the triple-layer itself being coated on each face with a layer of NBR rubber (3). In order to soften the layers of polyamide (2), it is necessary to add EPDM thereto. The layers (2) do not adhere well to the layer (1). It is also necessary to insert an adhesive between the layers (2) and (3).

SUMMARY OF THE INVENTION

It is an object of the invention to propose a hydropneumatic accumulator membrane which makes it possible to avoid the drawbacks mentioned above and which is of high stability towards ageing at high temperature.

The subject of the invention is thus a gas-impermeable elastic membrane intended in particular to equip a hydropneumatic accumulator, and comprising at least:
 a film formed
  of a skin of a gas-impermeable copolymer containing —OH groups,
  and of two layers between which is incorporated the skin and which consist of a flexible and elastic material of a copolymer containing polyamide blocks and polyether blocks, a rubber coating optionally being placed on at least one layer of the flexible and elastic material.

The membranes according to the invention are impermeable and thermoformable, have good heat resistance, low rigidification under cold conditions, and are flexible over a wide temperature range without it being necessary to add plasticizers to the gas-impermeable skin, or to the layers of the copolymer containing polyamide blocks and polyether blocks. Furthermore, depending on the types of rubber copolymer used, no adhesive or binder is necessary.

According to another characteristic of the invention, the gas-impermeable copolymer is a copolymer of a monomer of formula $CH_2=CH-R$ in which R is H or an alkyl group, with a monomer of formula $CH_2=CH-(R')_xOH$ in which x is equal to 0 or 1 and R' is an alkyl group, and more particularly a copolymer of ethylene and of vinyl alcohol.

According to an advantageous form, the membrane of the invention comprises a rubber coating on at least one of its faces and preferably on both faces.

According to other characteristics of the invention:
 the rubber is, for example, a nitrile rubber and contains carboxylic, amino or epoxy functional groups,
 the melting point of the film formed by the skin and the layers of flexible and elastic material is greater than 160° C.,
 the thickness of the skin is between 25 and 100 micrometers, and
 the thickness of each layer of the flexible material and of the rubber is between 200 and 600 micrometers.

The invention also relates to a process for manufacturing such a membrane. The process consists in carrying out a coextrusion of the skin and the layers in order to obtain a film,. optional drying in order to remove water from the layers, optionally followed by thermoforming in order to give the film the desired shape, and molding with vulcanization of the rubber.

A coextrusion binder can be placed between the skin and the layers of flexible and elastic material.

The drying is preferably carried out for 24 hours at 70° C.

The molding with the rubber is carried out at a temperature below the melting point of the film formed by the skin and the layers.

The binding between the rubber and the film can be achieved using an adhesive which is placed beforehand on the outer faces of the film. If the rubber has functional groups, it is not necessary to use an adhesive.

The adhesive comprises a non-polar solvent such as xylene or a ketone.

BRIEF DESCRIPTION OF THE DRAWING

The characteristics and advantages of the invention will become apparent from the following description, which is given purely by way of example and with reference to the attached single

Figure 1:
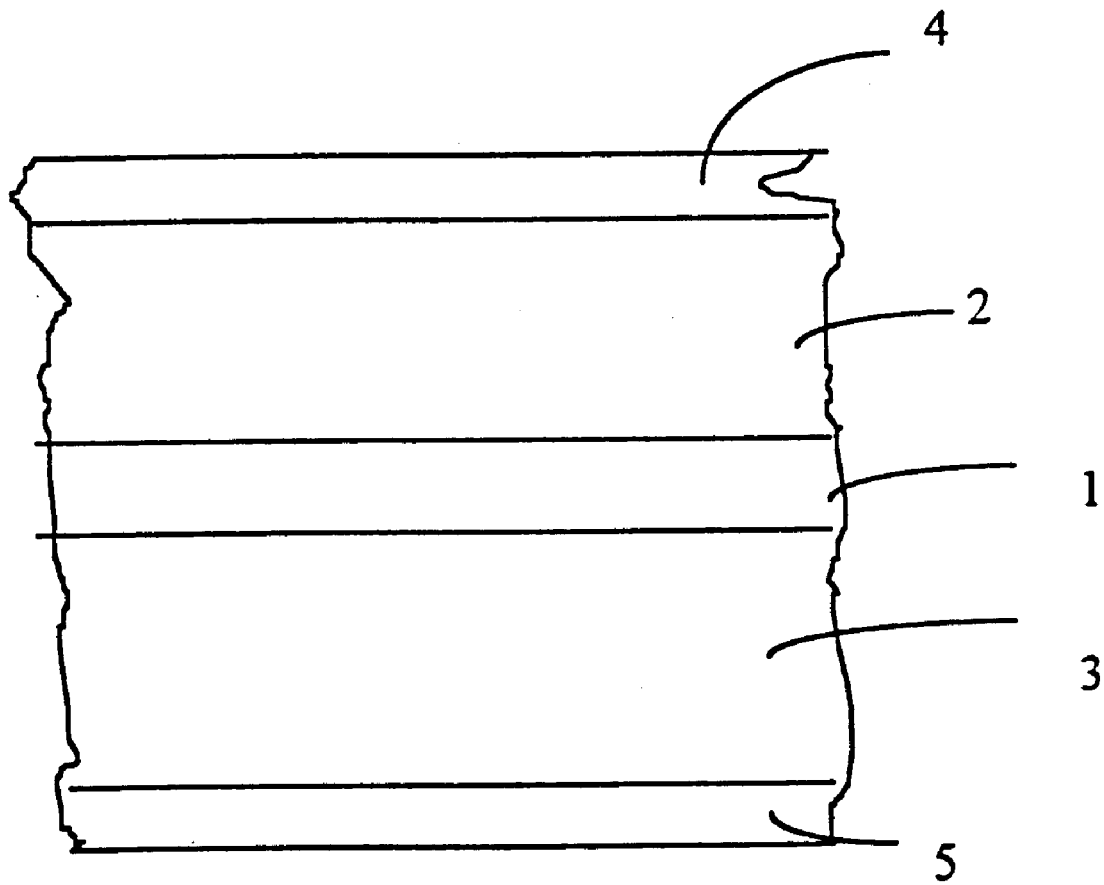
FIG. 1, is a cross-sectional view of the membrane according to the preferred form of the invention.

The membrane represented in FIG. 1 comprises a skin 1 of a rigid material which is impermeable to gases, more particularly to nitrogen. The skin 1 is inserted between two layers 2 and 3 consisting of a flexible and elastic material.

The gas-impermeable material is a partially crystalline copolymer containing —OH groups. Advantageously, it comprises units

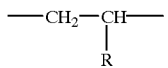

in which R is H or an alkyl group, and units

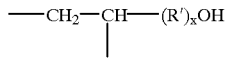

in which x is equal to 0 or 1 and R' is an alkyl group.

EVOH is advantageously used.

EVOH is a copolymer consisting essentially of ethylene and vinyl alcohol units-and can contain small amounts of other monomer units, in particular vinyl ester units. These copolymers can be obtained by total or partial saponification or alcoholysis of ethylene/vinyl ester copolymer. Among the vinyl esters, vinyl acetate is the preferred monomer. The degree of saponification or of alcoholysis is at least equal to 90 mol % and is preferably between 54 and 99.5 mol %. The molar proportion of ethylene in the EVOH is within the range from 3 to 75%, preferably from 10 to 50%.

It would not be considered a departure from the scope of the invention to use mixtures of EVOH and of polyolefin containing an EVOH matrix. Such mixtures are described in the documents EP-A-418,129 and EP-A-441,666, the content of which is incorporated in the present application.

It would also not be considered a departure from the scope of the present invention to replace all or part of the EVOH by EVOH modified by acylation or urethanization. The acylation is carried out with an acid chloride, an acid or an anhydride, advantageously with an acid chloride such as benzoyl chloride. The urethanization is advantageously carried out with an isocyanate such as, for example, phenyl isocyanate or benzyl isocyanate. Such products are described in application WO 95/12624, the content of which is incorporated in the present application.

EVOH has excellent impermeability to gases. For example, if it is compared with other compounds and its permeability to $O_2$ at 20° C. is measured (in cc. 20 $\mu$/m², 24 h, atm), the following results are obtained:

| Compound | Permeability |
| --- | --- |
| Ethylene/vinyl alcohol (EVOH) copolymer | 0.4 to 1.5 |
| Polyvinyl alcohol (PVAL) | 0.1 |
| Polyvinyl alcohol plasticized with glyceryl (35 parts) | 10 |
| Polyamide (PA) | 76 |
| Polyester (PET) | 69 |

EVOH has flexibility properties and is easy to use on account of the presence of ethylene comonomer, when compared with other materials such as PVAL which require a plasticizer for their conversion. This is because plasticizer-free PVAL degrades before melting. In contrast, EVOH can be used free of plasticizer.

The skin 1 is incorporated between two layers 2, 3 consisting of a flexible and elastic material. A material which is flexible without the use of a plasticizer and which has excellent hear and cold resistance is chosen. Such a material is preferably a copolymer containing polyamide blocks and polyether blocks, which will be referred to as PEBA (polyether block amide) in the text hereinbelow.

The role of this material is to provide thickness without providing too much rigidity to the film formed by the skin 1 and the layers 2, 3. Furthermore, the thermoplastic elastomer properties of the PEBA are used.

The polymers containing polyamide blocks and polyether blocks result from the copolycondensation of polyamide blocks containing reactive ends with polyether blocks containing reactive ends, such as, inter alia:

polyamide blocks containing diamine chain ends with polyoxyalkylene blocks containing dicarboxylic chain ends;

polyamide blocks containing dicarboxylic chain ends with polyoxyalkylene blocks containing diamine chain ends, obtained by cyanoethylation and hydrogenation of aliphatic, $\alpha,\Omega$-dihydroxylated polyoxyalkylene blocks known as polyetherdiols;

polyamide blocks containing dicarboxylic chain ends with polyetherdiols, the products obtained being, in this particular case, polyetheresteramides.

The blocks containing dicarboxylic chain ends are derived, for example, from the condensation of $\alpha,\Omega$-aminocarboxylic acids of lactams or of dicarboxylic acids and diamines in the presence of a chain-limiting dicarboxylic acid. Advantageously, the polyamide blocks are polyamide-12 (PA-12) or polyamide-6 (PA-6).

The number-average molar mass $M_n$ of the polyamide blocks is between 300 and 15,000 and preferably between 600 and 5000. The mass $M_n$ of the polyether blocks is between 100 and 6000 and preferably between 200 and 3000.

The polymers containing polyamide blocks and polyether blocks can also comprise randomly distributed units. These polymers can be prepared by simultaneous reaction of the polyether and the precursors of the polyamide blocks.

For example, a polyetherdiol, a lactam (or an $\alpha,\Omega$-amino acid) and a chain-limiting diacid can be reacted together in the presence of a small amount of water. A polymer is obtained essentially having polyether blocks, polyamide blocks of very variable length, but also the various reagents which have reacted randomly and are distributed randomly along the polymer chain.

Whether they are derived from the copolycondensation of polyamide blocks and polyether blocks prepared beforehand or from a one-step reaction, these polymers containing polyamide blocks and polyether blocks have, for example, Shore D hardnesses which can be between 20 and 75 and advantageously between 30 and 70, and an intrinsic viscosity between 0.8 and 2.5, measured in meta-cresol at 250° C. for an initial concentration of 0.8 g/100 ml.

Whether the polyether blocks are derived from polyethylene glycol, from polyoxypropylene glycol or from polyoxytetramethylene glycol, they are either used as they are and copolycondensed with polyamide blocks containing carboxylic ends, or they are aminated in order to be converted into polyetherdiamines and condensed with polyamide blocks containing carboxylic ends. They can thus be mixed with polyamide precursors and a chain-limiting agent in order to make the polymers containing polyamide blocks and polyether blocks having randomly distributed units.

Polymers containing polyamide-blocks and polyether blocks are described in U.S. Pat. Nos. 4,331,786, 4,115,475, 4,195,015, 4,839,441, 4,864,014, 4,230,838 and 4,332,920.

The polyether can be, for example, a polyethylene glycol (PEG), a polypropylene glycol (PPG) or a polytetramethylene glycol (PTMG). The latter is also known as polytetrahydrofuran (PTHF).

Whether the polyether blocks are in the chain of the polymer containing polyamide blocks and polyether blocks in the form of diols or diamines, they are referred to for simplicity as PEG blocks or PPG blocks or else PTMG blocks.

It would not be considered a departure from the scope of the invention if the polyether blocks contained different units such as units derived from ethylene glycol, from propylene glycol or from tetramethylene glycol.

Preferably, the polymer containing polyamide blocks or polyether blocks comprises only one type of polyamide block and only one type of polyether block. Polymers containing PA-12 blocks and PTMG blocks and polymers containing PA-6 blocks and PTMG blocks are advantageously used.

A mixture of two or more polymers containing polyamide blocks and polyether blocks can also be used.

Advantageously, the polymer containing polyamide blocks and polyether blocks is such that the polyamide is the major constituent by weight, i.e. the amount of polyamide which is in the form of blocks and that which is possibly randomly distributed in the chain represents 50% by weight or more of the polymer containing polyamide blocks and polyether blocks. Advantageously, the amount of polyamide and the amount of polyether are in the ratio (polyamide/polyether) from 1/1 to 3/1.

A coextrusion binder can optionally be placed between the skin of impermeable copolymer and the layers of flexible and elastic material.

By way of a example of a binder, mention may be made of:
  polyethylene, polypropylene, copolymers of ethylene and of at least one α-olefin, and mixtures of these polymers, all of these polymers being grafted with unsaturated carboxylic acid anhydrides such as, for example, maleic anhydride. Mixtures of these grafted polymers and of these non-grafted polymers can also be used.
  copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their hemiesters and their anhydrides, (iv) unsaturated epoxides; these copolymers can be grafted with unsaturated dicarboxylic acid anhydrides such as maleic anhydride or unsaturated epoxides such as glycidyl methacrylate.

The thickness of this binder can be from 15 to 30 μm. If the PEBA comprises PA-6 blocks and PTMG blocks, it is not necessary to use a binder between the layers of PEBA and the skin of impermeable copolymer.

Due to the fact that EVOH contains no plasticizer, the film formed by the skin 1 and the layers 2, 3 has excellent stability over time and heat stability. For example, if the stability of the film PEBA/EVOH/PEBA is compared with a film of polyvinyl alcohol plasticized with glycerol, the following results are obtained, after exposure to air at 100° C. for 16 hours:

|  | Variation of the 50 modulus | Variation of the elongation |
| --- | --- | --- |
| PEBA/EVOH/PEBA film | +3% | +8% |
| PVAL film plasticized with glycerol | +300% | −50% |

It will thus be evident, seen that the film according to the invention is much more stable than the plasticized PVAL film.

Preferably, the thickness of the skin 1 is chosen so as to be as thin as possible, in order for the film not to be too rigid, but so as to be sufficient to give the assembly impermeability to gases. For example, the thickness of the skin 1 can be between 50 and 200 micrometers.

If a plasticized PVAL film having a thickness of 1300 micrometers is compared with a film according to the invention consisting of a skin of EVOH of 100 micrometers in thickness and of two layers of PEBA each of 600 micrometers, for comparable modulus values, the level of gas permeability is of the same order of magnitude:

|  | Plasticized PVAL | PEBA/EVOH/PEBA |
| --- | --- | --- |
| Thickness (in μm) | 1300 | 600/100/600 |
| 25% modulus (in MPa) | 14 | 12 |
| Permeability (in m$^2$/Pa · s) | 10$^{-18}$ | 5 × 10$^{-18}$ |

Preferably, the thickness of each of the layers 2, 3 is between 200 and 600 micrometers.

According to a particular form of the invention, a coating 4 is placed on at least one layer 2 of flexible and elastic material, but preferably each layer 2, 3 contains a coating 4, 5. This coating is made of rubber. The role of the rubber is to provide the resistance to the hydraulic fluid, namely the mineral oil, placed in a compartment of the hydropneumatic accumulator, and to provide the leaktightness of the membrane mounting in this accumulator.

By way of example of rubber, mention may be made of natural rubber, polyisoprene having a high level of double bonding in the cis position, a polymerized emulsion based on styrene/butadiene copolymer, a polybutadiene having a high level of double bonding in the cis position, obtained by nickel, cobalt, titanium or neodymium catalysis, a halogenated ethylene/propylene/diene terpolymer, a halogenated butyl rubber, a styrene/butadiene block copolymer, a styrene/isoprene block copolymer, the halogen-containing products of the above polymers, an acrylonitrile/butadiene copolymer, an acrylic elastomer, a fluoroelastomer and chloroprene. Epichlorohydrin rubbers are also used.

Functionalized rubbers such as those having arboxylic acid, carboxylic acid anhydride, epoxide or mine groups are advantageously used. Carboxyl or anhydride groups are preferred.

When the elastomers mentioned above contain no carboxylic acid radicals or anhydride radicals of the said acids (which is the case for most of them), the radicals will be provided by grafting, in a known manner, of the elastomers mentioned above, or by mixtures of elastomers, for example with elastomers containing grafted or copolymerized acrylic acid.

Among the elastomers mentioned above, those included in the following group will advantageously be chosen: carboxylated nitrile elastomers, carboxylated acrylic elastomers, carboxylated polybutadienes, grafted ethylene/propylene/diene terpolymers or mixtures of these polymers with the identical but non-grafted elastomers, such as nitrile rubbers, polybutadienes and ethylene/propylene/diene terpolymers, alone or as a mixture.

Preferably, the abovementioned vulcanizable elastomers contain a weight proportion of carboxylic acid radicals or dicarboxylic acid anhydride radicals of between 0.3 and 100% relative to the elastomers.

The vulcanization systems which are suitable for the present invention are well known to those skilled in the art and, consequently, the invention is not limited to a specific type of system.

The rubbers can be modified by the addition of fillers such as carbon black, silica, kaolin, aluminum oxide, clay, talc, chalk, etc. These fillers an be surface-treated with silanes, polyethylene glycols or any other coupling molecule. In general, the proportion of fillers in parts by weight is between 5 and 100 per 100 parts of elastomers.

In addition, the compositions can be made flexible by plasticizers such as mineral oils derived from petroleum, phthalic acid esters or sebacic acid esters, liquid polymer plasticizers such as polybutadiene of low mass which is optionally carboxylated, and other plasticizers which are well known to those skilled in the art.

The rubber is, for example, a nitrile rubber of formula:

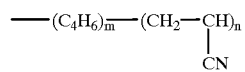

which preferably contains carboxyl groups. Such a carboxylated nitrile rubber has the following formula (which is denoted by X-NBR):

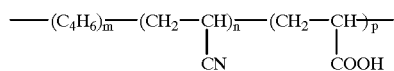

By way of example, the rubber is a copolymer of 1,3-butadiene, of acrylonitrile and of acrylic acid.

When the coatings 4, 5 are made of non-functionalized rubber, the layers 2, 3 are attached together solidly by means of an adhesive 6, 7 placed on the outer faces of the layers 2, 3. Such an adhesive is chosen so as not to act on the physical and/or chemical properties of the film formed by the skin 1 and the layers 2, 3. Thus, the adhesive will not contain alcohol-type polar solvents such as ethanol, and an adhesive containing a non-polar solvent such as xylene or a ketone will be used.

The invention also relates to a process for manufacturing a membrane as described above.

Direct coextrusion of a copolymer of ethylene and of vinyl alcohol with a polyether block amide is carried out in order to obtain a film containing three layers, with a total thickness of between 0.425 and 1.3 mm. The film is such that the central skin 1 has a thickness of between 25 and 100 micrometers and is coated on each side with a flexible material 2, 3 with a thickness of between 200 and 600 micrometers. This film contains no plasticizer and can be stored and packaged more easily and shows better aging under hot conditions.

A coextrusion binder can optionally be placed between the skin and each layer of polyether block amide.

It is recommended to dry the film in order to remove the traces of water contained in the PEBA and to improve the cohesion between the skin 1 and the layers 2, 3. The drying is carried out at a temperature of 70° C. for 24 hours. The melting point of the film is greater than 160° C. in order to ensure its subsequent use and its behavior during its subsequent use.

If necessary, the film is thermoformed to give it the desired shape, in order for it to fit into the hydropneumatic accumulator for which it is intended.

An adhesive is optionally placed on the outer faces of the film, after which molding and vulcanization of the rubber are carried out on the film. Molding with the rubber is carried out at a temperature below the melting point of the film, for example below 160° C.

A carboxylated nitrile rubber can be used and, in this case, no adhesive is placed on the outer faces of the membrane. The non-vulcanized rubber is molded on the film, i.e. on at least one of the layers of the flexible and elastic material optionally coated with an adhesive. The rubber which is molded on is more specifically a mixture containing the base elastomer (for example the X-NBR), vulcanization agents and fillers. The vulcanization is carried out at a temperature below the melting point of the film. The assembly of the film coated with the rubber is thus vulcanized at a temperature which is sufficient to bring about vulcanization but below the melting point of the film.

The melting point of the skin and that of the layers of the flexible material is generally from about 140 to 170° C. The duration of the vulcanization can be between a few minutes and 15 minutes.

Advantageously, the kinetics measured using an oscillating rheometer will be such that the characteristic time for 90% vulcanization, $t_{90}$, does not exceed 15 minutes and will advantageously be between 5 and 10 minutes.

Moreover, it has been found that the vulcanization start time (or setting time) corresponding to an increase in torque of 0.2 N.m was an important factor for obtaining materials showing high-quality performance. Thus, it is advantageous for the abovementioned increase in torque to be achieved in a time longer than or equal to 4 minutes at the molding temperature and preferably between 4 and 5 minutes.

The Applicant has observed that if the vulcanization was too rapid the adhesion to the film was poor.

As regards the film in which the layers of the flexible and elastic material is PEBA, the vulcanization is advantageously carried out at a temperature close to the VICAT point of the PEBA.

The VICAT point, or the softening point, is a well-known parameter for measuring the physical properties of a polymer. The VICAT point is the temperature at which a needle with a circular cross-section of 1 mm² penetrates 1 mm into the sample during an increase in temperature of 50° C. per hour, according to ASTM standard D1525. Thus, at this temperature, the polymer does not flow and is not in the molten state.

The molding followed by vulcanization is described in EP-A-550,346 and EP-A-607,085, the content of which is incorporated in the present application.

As regards PEBAs in which the blocks are PA-6 and PTMG, the Applicant has found that the vulcanization can be carried out over a much wider temperature range around the VICAT point; it is thus even easier to move further away from the melting point of the PEBA. This technique is described in EP-A-682,060, the content of which is incorporated in the present application.

What is claimed is:

1. A gas-impermeable elastic membrane, said membrane comprising at least:
    (a) a co-polymeric gas-impermeable film including OH groups; and
    (b) two layers of a supple and elastic material of a co-polymer containing blocks of polyamides and blocks of polyethers, said film being positioned between said layers.

2. The elastic impermeable membrane set forth in claim 1, wherein the film includes a co-polymer of ethylene and vinyl alcohol.

3. The elastic impermeable membrane set forth in claim 1, wherein the thickness of the film is between 25 and 100 $\mu$m.

4. The elastic impermeable membrane set forth in claim 1, wherein the thickness of the supple and elastic layers is between 200 and 600 $\mu$m.

5. The elastic impermeable membrane set forth in claim 1, further including a rubber coating positioned on at least one of said layers of elastic and supple material.

6. The elastic impermeable membrane set forth in claim 5, wherein the rubber coating is located on each of the layers.

7. The elastic impermeable membrane set forth in claim 5, wherein the rubber of the coating is a co-polymer of 1.3 butadiene, of acrylonitrile and acrylic acid.

8. A method for manufacturing a membrane comprising the steps of:
    (a) preparing a formed film having two layers by coextrusion;
    (b) thermal forming said film;
    (c) molding said film with non-vulcanized rubber as a coating; and
    (d) vulcanizing the rubber at a temperature sufficient to complete vulcanization but below a fusion temperature.

* * * * *